United States Patent
Botzer

(10) Patent No.: US 9,836,321 B2
(45) Date of Patent: *Dec. 5, 2017

(54) TRANSMITTING ENCAPSULATED SNMP COMMANDS TO VIRTUAL MACHINES

(71) Applicant: Red Hat Israel, Ltd., Ra'anana (IL)

(72) Inventor: David Botzer, Kfar Yona (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,488

(22) Filed: Jul. 27, 2016

(65) Prior Publication Data

US 2016/0357590 A1 Dec. 8, 2016

Related U.S. Application Data

(63) Continuation of application No. 14/178,284, filed on Feb. 12, 2014, now Pat. No. 9,413,594.

(51) Int. Cl.
| | | |
|---|---|---|
| *G06F 9/455* | (2006.01) | |
| *H04L 12/24* | (2006.01) | |
| *H04L 12/26* | (2006.01) | |

(52) U.S. Cl.
CPC ...... *G06F 9/45558* (2013.01); *H04L 41/0213* (2013.01); *H04L 43/10* (2013.01); *G06F 2009/45595* (2013.01)

(58) Field of Classification Search
None
See application file for complete search history.

(56) References Cited

U.S. PATENT DOCUMENTS

| | | |
|---|---|---|
| 6,789,090 B1 | 9/2004 | Miyake et al. |
| 7,167,473 B1 | 1/2007 | Nguyen |
| 7,197,561 B1 | 3/2007 | Lovy et al. |
| 7,925,731 B2 | 4/2011 | Adams et al. |
| 8,291,070 B2 | 10/2012 | Heim et al. |
| 8,352,459 B2 | 1/2013 | Pennell, Sr. et al. |
| 2002/0065908 A1* | 5/2002 | Agerholm .......... H04L 41/0213 709/223 |
| 2008/0147833 A1 | 6/2008 | Adams et al. |
| 2009/0024994 A1 | 1/2009 | Kannan et al. |
| 2011/0113136 A1 | 5/2011 | Phaal |
| 2011/0113472 A1 | 5/2011 | Fung et al. |
| 2012/0102190 A1 | 4/2012 | Durham et al. |
| 2013/0124712 A1 | 5/2013 | Parker |
| 2013/0191524 A1 | 7/2013 | Dupre et al. |
| 2014/0007204 A1 | 1/2014 | Branch et al. |

(Continued)

OTHER PUBLICATIONS

Thottan, Marina K. et al., "SEQUIN: An SNMP-Based MPLS Network Monitoring System", 2003 Lucent Technologies Inc., Published by Wiley Periodicals, Inc. (17 pages).

(Continued)

*Primary Examiner* — Dong Kim
(74) *Attorney, Agent, or Firm* — Lowenstein Sandler LLP

(57) ABSTRACT

Systems and methods for transmitting encapsulated SNMP commands to virtual machines. An example method may comprise: receiving a Simple Network Management Protocol (SNMP) request; encapsulating, by a processing device, the SNMP request in a format compatible with respect to which a virtual machine is configured to communicate; and providing the encapsulated SNMP request to the virtual machine.

20 Claims, 5 Drawing Sheets

(56) References Cited

U.S. PATENT DOCUMENTS

2014/0310409 A1* 10/2014 Ohsuga ............... G06F 11/3065
  709/224
2015/0052280 A1*  2/2015 Lawson ................. G06F 13/28
  710/308

OTHER PUBLICATIONS

Burden, Andrew et al., "Red Hat Enterprise Virtualization 3.1 Installation Guide", 2012 Red Hat, Inc. (160 pages).
Haen, Christophe, "Development of a Dynamic Network Monitoring Tool Interactive Map Based on LLDP and SNMP", Apr.-Sep. 2010 (55 pages).
U.S. Office Action for U.S. Appl. No. 14/178,284, dated Jul. 20, 2015 (24 pages).
U.S. Office Action for U.S. Appl. No. 14/178,284, dated Nov. 17, 2015 (22 pages).
U.S. Advisory Action for U.S. Appl. No. 14/178,284, dated Jan. 27, 2016 (4 pages).
U.S. Notice of Allowance and Fee(s) Due for U.S. Appl. No. 14/178,284, dated Mar. 31, 2016 (11 pages).

* cited by examiner

TRANSMITTING ENCAPSULATED SNMP COMMANDS TO VIRTUAL MACHINES

CROSS-REFERENCE TO RELATED APPLICATION

This application is a continuation of U.S. patent application Ser. No. 14/178,284, filed on Feb. 12, 2014, which is hereby incorporated by reference in its entirety.

TECHNICAL FIELD

The present disclosure is generally related to virtualized computer systems, and is more specifically related to systems and methods for transmitting encapsulated SNMP commands to virtual machines.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Simple Network Management Protocol (SNMP) is a widely used protocol for communicating with and managing devices connected to one or more networks. Numerous devices (e.g., network devices such as routers, switches, etc.) utilize SNMP and various applications and utilities enable users (e.g., administrators) to monitor, configure, etc., such devices via SNMP, maintain records/databases reflecting the historical and current operation of such devices, etc. However, virtual entities (such as virtual machines) do not utilize SNMP for monitoring, configuration, etc., and separate utilities, applications, etc., are often used (independent of those used for network devices), specifically with respect to virtual machines.

Accordingly, described herein are methods and systems for transmitting encapsulated SNMP commands to virtual machines. As described herein, a virtualization manager executing on a host computer can enable centralized monitoring and management of both virtual machines executing on the host as well as connected network devices via Simple Network Management Protocol (SNMP). In doing so, the virtualization manager can encapsulate received SNMP requests/commands, and can provide such encapsulated requests/commands to the virtual machine(s) and/or devices to which they are directed. Additionally, a SNMP database (e.g., a management information base (MIB)) can be maintained, containing current and historical information pertaining to the SNMP requests/commands (including those encapsulated SNMP requests/commands directed to virtual machines). In doing so, both virtual machines and network devices can be monitored and managed via a single SNMP management interface (e.g., a GUI).

Various aspects of the above referenced methods and systems are described in details herein below by way of examples, rather than by way of limitation.

Figure 1:
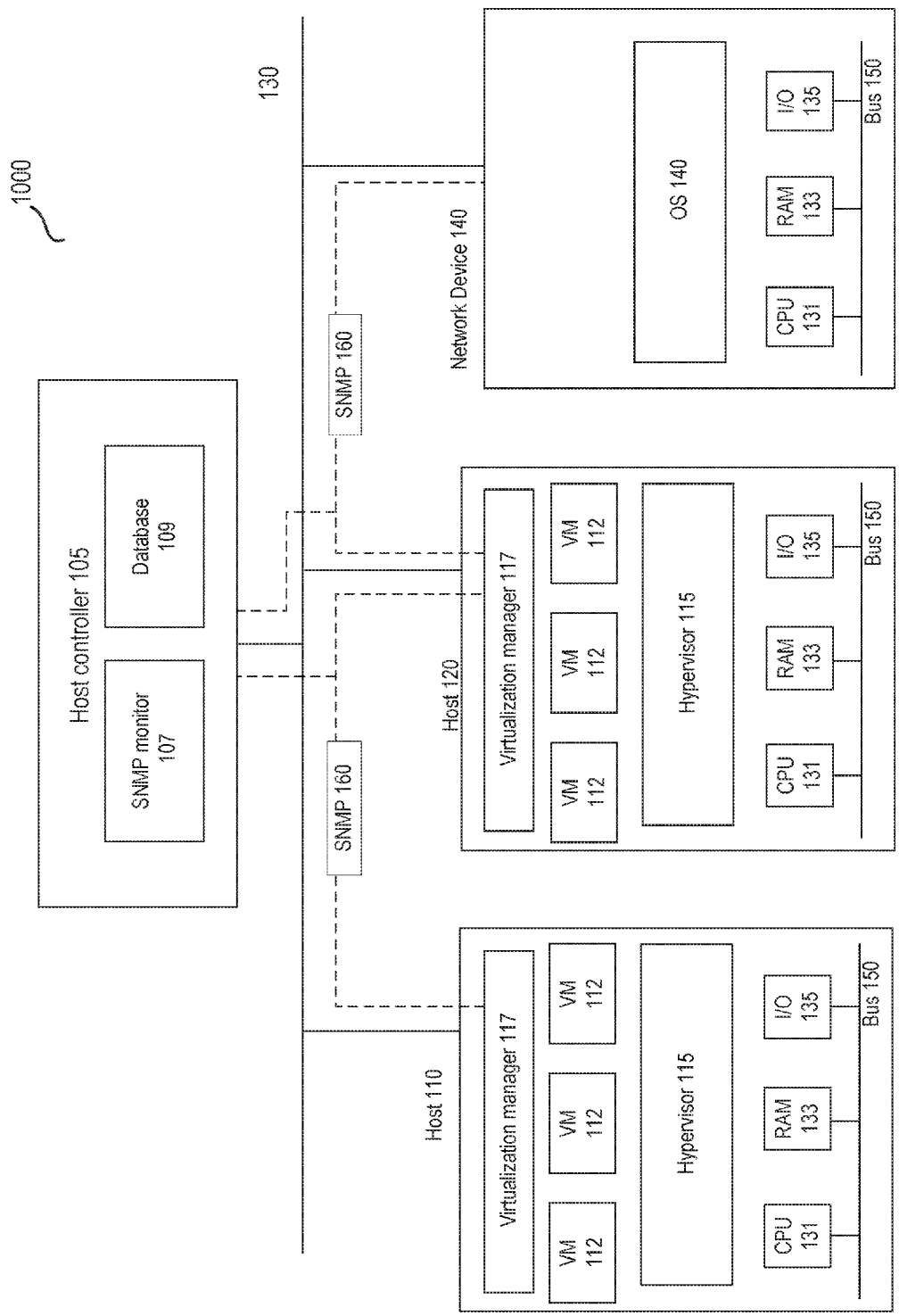
FIG. 1 depicts a high-level component diagram of an illustrative example computer system in accordance with one or more aspects of the present disclosure.

FIG. 1 depicts a high-level component diagram of one illustrative example of a computer system 1000 in accordance with one or more aspects of the present disclosure. The computer system 1000 may include computer systems 110, 120 (e.g., host computer systems), and 140 (e.g., a network device) interconnected via a network 130. Each of the host computer systems 110 and 120 and network device 140 may include one or more processors 131 communicatively coupled to memory devices 133 and input/output (I/O) devices 135. Local connections within each of the hosts 110 and 120, including the connections between processors 131, memory 133, and I/O devices 135 may be provided by one or more local buses 150 of suitable architecture.

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Host computer systems 110 and 120 may run a plurality of virtual machines 112, by executing hypervisor 115. Each hypervisors 115 may abstract the physical layer, including processors, memory, and I/O devices, and present this abstraction to virtual machines 112 as virtual devices, including virtual processors, virtual memory, and virtual I/O devices.

Virtual machine 112 may execute a guest operating system which may utilize the underlying virtual devices, including virtual processors, virtual memory, and virtual I/O devices. One or more applications may be running on virtual machine 112 under the guest operating system.

Host computer systems 110 and 120 may also run a virtualization manager 117. Examples of virtualization manager 117 include, but are not limited to, Virtual Desktop and Server Manager (VDSM). Virtualization manager 117 may be part of hypervisor 115 or a host operating system (not shown). Alternatively, virtualization manager 117 can be an independent application running on top of the host operating system. Virtualization manager 117 can configure and manage various communications to/from the host and/or various virtual machines executing thereon. For example, as described herein, virtualization manager 117 can configure and manage communications between various hosts, virtual machines, and/or network devices over network 130 using Simple Network Management Protocol (SNMP) 160.

Network device 140 can be a device such as a router, switch, etc., which can connect various computer devices and/or networks to one another, route network traffic, etc. Additionally, as described herein, network device 140 can be configured to generate, transmit, and/or receive SNMP requests, instructions, and/or data to/from SNMP monitor 107 and/or host controller 105, and/or VM 112, virtualization manager 117, and/or hosts 110, 120.

As schematically illustrated by FIG. 1, host computer systems 110 and 120 and network device 140 may be communicatively coupled to a host controller 105 which may reside on a designated computer system or on one of the hosts 110, 120. Host controller 105 may manage a plurality of virtual machines, including virtual machines 112. Host controller 105 may create a virtual machine, delete a virtual machine, and perform other virtual machine management functions. In certain implementations, host controller 105 may include a SNMP monitor 107 which may generate, transmit, and/or receive SNMP requests, instructions, and/or data (e.g., status data) from various virtualization managers 117 and/or from one or more network devices 140 (e.g., over network 130), in accordance with one or more aspects of the present disclosure. For example, an SNMP request can be generated to request data (e.g., transmission data) from various virtualization managers and/or network devices. Moreover, in certain implementations a virtual machine and/or a virtualization manager can initiate/generate a request for data (e.g., transmission data) from one or more network devices and/or one or more virtual machines.

Additionally, in certain implementations host controller 105 can include database 109 which can store SNMP requests, instructions, and/or data (e.g., status data) transmitted to and/or received from virtualization managers 117 and/or network devices 140. In doing so, SNMP monitor 107 can generate reports, provide instructions, etc., in a single format (e.g., SNMP) that can be utilized with respect to both virtual machines 112, hosts 110, 120, and network devices 140. It should also be noted that while FIG. 1 depicts database 109 as being included within host controller 105, in other implementations (not shown) database 109 can be included within host 110, for example.

Example methods of transmitting encapsulated SNMP commands to virtual machines in accordance with one or more aspects of the present disclosure are described herein below with reference to the flow diagram of FIG. 2.

Figure 2:
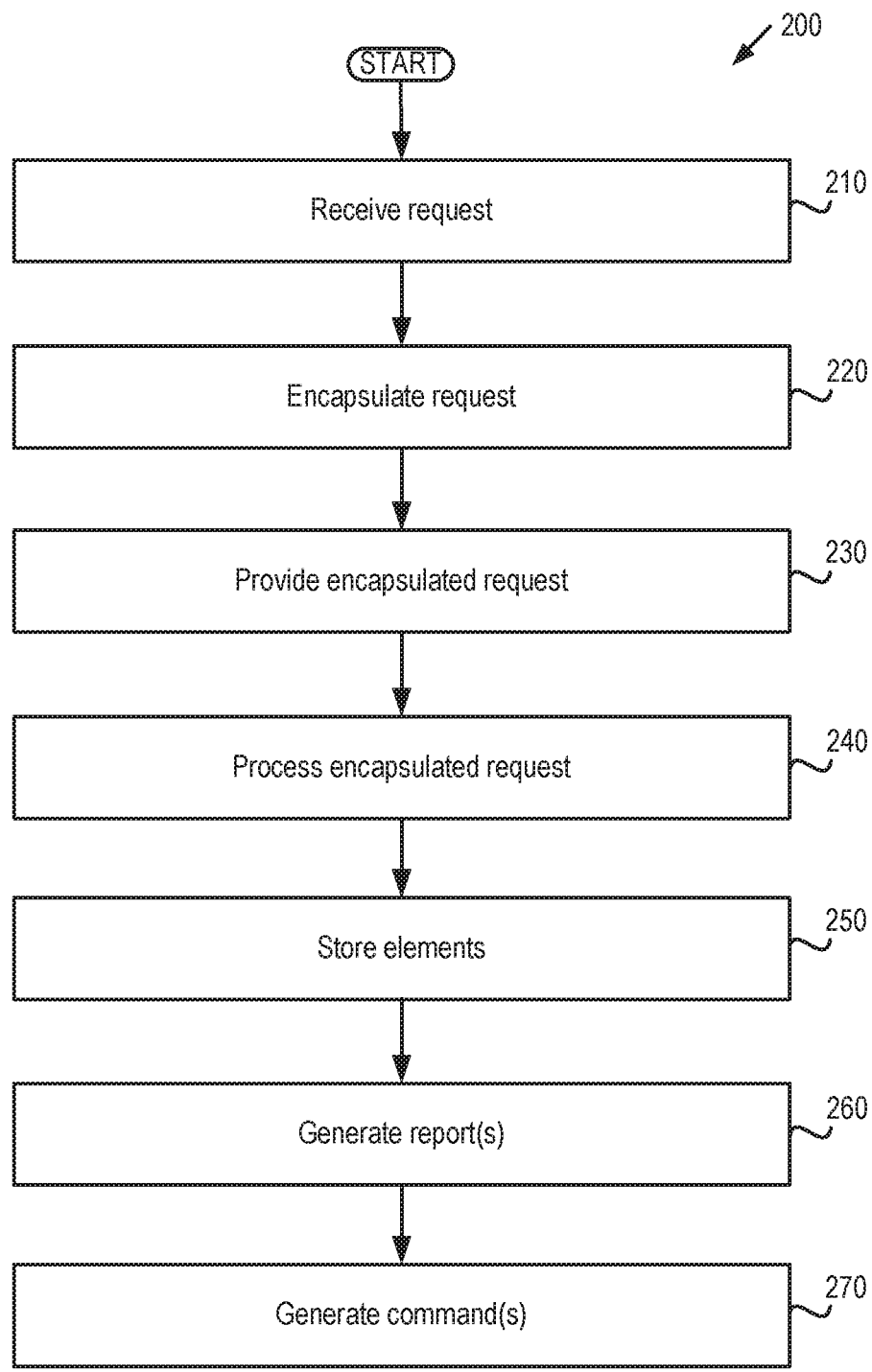
FIG. 2 depicts a flow diagram of an example method for transmitting encapsulated SNMP commands to virtual machines, in accordance with one or more aspects of the present disclosure.

FIG. 2 depicts a flow diagram of an illustrative example of a method 200 for transmitting encapsulated SNMP commands to virtual machines. Method 200 and/or each of its individual functions, routines, subroutines, or operations may be performed by one or more processors of the computer system (e.g., host controller 105, host 110, and/or host 120 of FIG. 1) executing the method. In certain implementations, method 200 may be performed by a single processing thread. Alternatively, method 200 may be performed by two or more processing threads, each thread executing one or more individual functions, routines, subroutines, or operations of the method. In an illustrative example, processing threads implementing method 200 may be synchronized (e.g., using semaphores, critical sections, and/or other thread synchronization mechanisms). Alternatively, the processing threads implementing method 200 may be executed asynchronously with respect to each other.

At block 210 a first request can be received. In certain implementations, such a request can be a Simple Network Management Protocol (SNMP) request. Moreover, in certain implementations, such a request can originate from a network device 140. The referenced SNMP request can be directed to a virtual machine 112 executing on a host device (e.g., host 120). For example, as shown in FIG. 1, network device 140 can send an SNMP request/command 160 via network 130 which can be directed to a particular virtual machine 112 executing on host 120. For example, upon detection of an error (e.g., by a network device), a request for status information can be generated (e.g., in order to identify the origin of the error, devices, virtual machines affected by the error, etc.). Such a request can be received by virtualization manager 117 at host 120.

At block 220, virtualization manager 117 executing on the host device (e.g., host 120) can encapsulate the SNMP request. That is, it can be appreciated that while network device 140 can be configured to send/received requests/commands via SNMP, virtual machine 112 may not (by default) be configured to properly receive/process such SNMP requests, as such a virtual machine may, instead, communicate via VDSM and/or any other such protocol. Accordingly, upon receiving an SNMP request/command from network device 140, virtualization manager 117 can encapsulate the received SNMP request (e.g., within a request/command format with respect to which the virtual machine is configured). Examples of such SNMP requests include, in SNMP v1: SNMP_EXTENSION_GET, SNMP_PDU_GET (which may retrieve the values of the specified variables), in SNMP v3: get (which can allow a user to gather data from one MIB variable), getnext (which can provide the next MIB variable in the MIB subtree), set (which can allow a user to set a MIB variable), show snmp statistics (which can provide various statistics, e.g., with respect to inputs, packets, etc.).

At block 230, the encapsulated SNMP request can be provided to the virtual machine 112. That is, having encapsulated (at block 220) the received SNMP request/command, the encapsulated SNMP request/command can be provided to the virtual machine 112 to which it is directed.

At block 240, the encapsulated SNMP request can be processed. In doing so, one or more elements of the encapsulated SNMP request can be extracted. That is, in addition to providing the encapsulated SNMP request to the virtual machine, virtualization manager 117 can process the encapsulated SNMP request/command. In doing so, the data within the encapsulated request can be parsed/extracted (e.g., into respective fields), such as in a manner that enables the encapsulated request to be compatible with/comparable to an SNMP database (e.g., a management information base (MIB)). As described herein, by extracting elements of the encapsulated request, the content of such a request can be stored in a format compatible with that utilized in an SNMP database, thereby enabling various database operations (e.g., queries, reports, etc.) to be performed with respect to data originating from both virtual devices (e.g., virtual machines) and physical devices (e.g., routers, etc.).

At block 250, one or more elements (such as those extracted at block 240) can be stored in a database. Examples of such elements can include data pertaining to the packets transmitted and/or received (e.g., the number of packets, their size, number of bad versions, etc.). In certain implementations, such a database can include a management information base (MIB). Moreover, in certain implementations, such a database can be configured to store elements originating at various virtual machines and as well as elements originating at various network devices. For example, as depicted in FIG. 1, database 109 can be configured to store data originating from SNMP requests/commands (as well as related/associated data) that originate from network devices and/or virtual machines.

At block, 260, one or more reports can be generated. In certain implementations, such reports can be generated based on the one or more elements originating at the virtual machine (such as those extracted at block 240) and/or one or more elements originating at the network device. That is, having extracted the various data elements from the SNMP requests/commands, and storing such data in database 109, various reports can be generated which can reflect both aspects of the performance of the associated virtual machines, as well as aspects of the performance of the network devices connected to the network.

At block 270, one or more commands can be generated. In certain implementations, such commands can be generated based on the one or more elements originating at the virtual machine and/or one or more elements originating at the network device. That is, having stored data from both virtual machines 112 and network devices 140 in a database 109 that utilizes a consistent SNMP format, various subsequent SNMP commands/requests can be generated and provided, such as requests that pertain to virtual machines and/or network devices. For example, one or more rules or conditions that pertain to both aspects of the functionality/operation of various virtual machines as well as aspects of the functionality/operation of various network devices can be used to generate SNMP requests, commands, etc., that can be directed to one or more virtual machines, network devices, etc. For example, in addition to requesting/receiving data via SNMP (e.g., via a GET command), SNMP can also be utilized to configure and/or set data/values, such as via a SET command. By way of illustration, a SET command can be used to set one or more values in various network devices (e.g., to configure a network switch). In doing so, a single, uniform interface can be provided (via SNMP monitor 107) for the monitoring, management, etc., of virtual machines and network devices using a unified set of protocols (e.g., SNMP).

Figure 3:
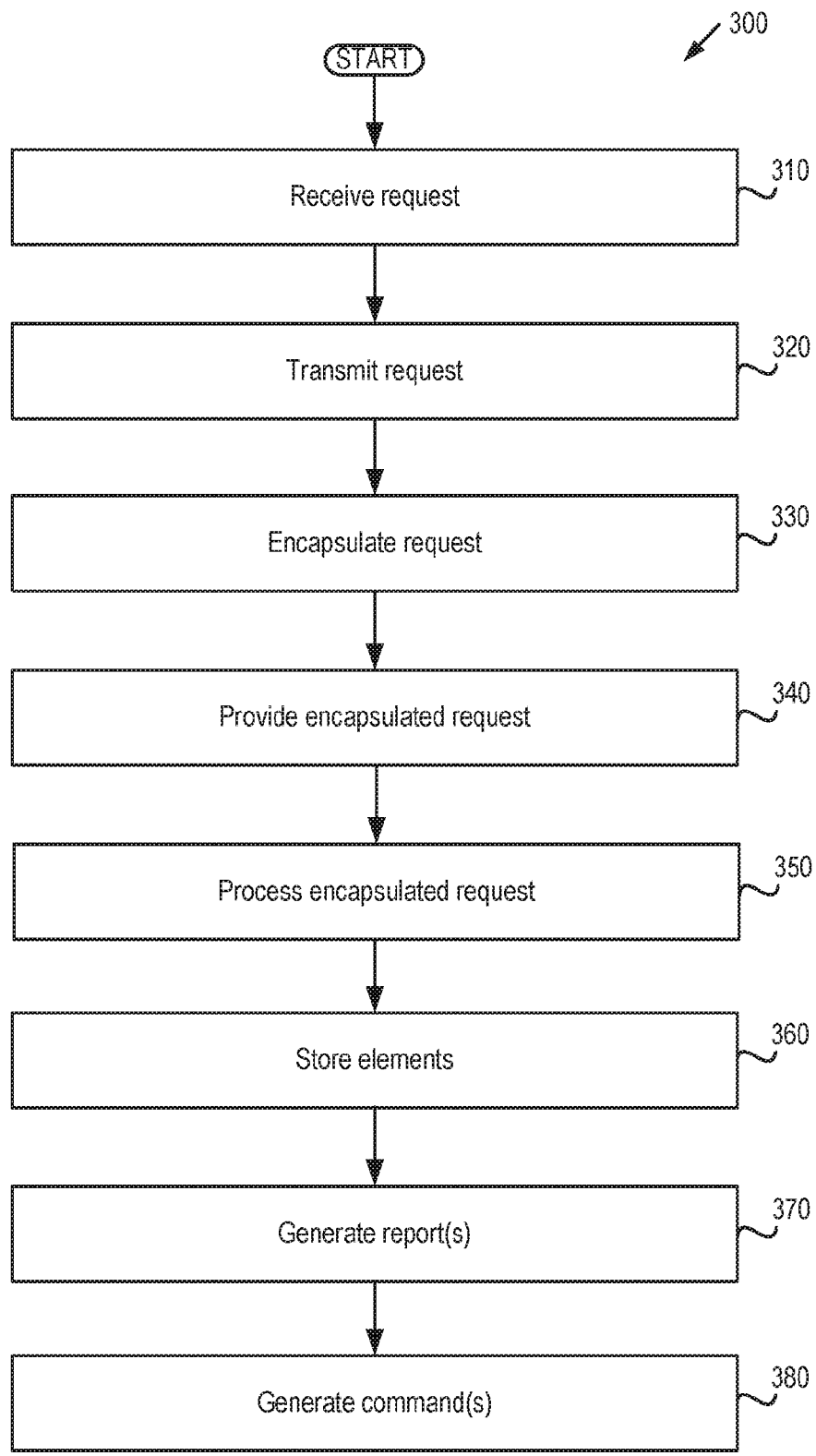
FIG. 3 depicts a flow diagram of an example method for transmitting encapsulated SNMP commands to virtual machines, in accordance with one or more aspects of the present disclosure.

FIG. 3 depicts a flow diagram of an illustrative example of a method 300 for transmitting encapsulated SNMP commands to virtual machines. Method 300 and/or each of its individual functions, routines, subroutines, or operations may be performed by one or more processors of the computer system (e.g., host controller 105, host 110, and/or host 120 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a data collection request can be received. In certain implementations, such a request can originate from SNMP monitor 107 on host controller 105, and be received at a virtualization manager 117 executing on a host device (e.g., host 120). In certain implementations, such a request can be a Simple Network Management Protocol (SNMP) request. The referenced SNMP request can be directed to a network device 140 that is connected (via network 130) to host 120, as well as to virtual machine 112 executing on host 120. For example, as shown in FIG. 1, SNMP monitor 107 on host controller 105 can send an SNMP request/command 160 via network 130 to host 120 which can be directed to a particular virtual machine 112 executing on host 120 and to a network device 140 connected to the host 120. Such a request can be received by virtualization manager 117 at host 120.

At block 320, a first data collection request can be transmitted. In certain implementations, such a request can be transmitted by virtualization manager 117 to a network device 140 connected to the host device 120. Moreover, in certain implementations such a request can include a Simple Network Management Protocol (SNMP) data collection request. For example, upon detection of an error (e.g., by a network device), a request for status information can be generated (e.g., in order to identify the origin of the error, devices, virtual machines affected by the error, etc.).

At block 330, the SNMP data collection request (such as that transmitted at block 320) can be encapsulated. That is, it can be appreciated that while network device 140 can be configured to receive the requests/commands from virtualization manager 117 via SNMP, virtual machine 112 may not (by default) be configured to properly receive/process such SNMP requests, as such a virtual machine may, instead, communicate via VDSM and/or any other such protocol. Accordingly, upon receiving an SNMP request/command from host controller 105, virtualization manager 117 can encapsulate the received SNMP request (e.g., within a request/command format with respect to which the virtual machine is configured).

At block 340, the encapsulated SNMP data collection request can be provided. In certain implementations, such an encapsulated request can be provided to a virtual machine 112 executing on the host device. That is, having encapsulated (at block 330) the received SNMP request/command, the encapsulated SNMP request/command can be provided to the virtual machine 112 to which it is directed.

At block 350, the encapsulated SNMP data collection request can be processed. In doing so, various elements of the encapsulated SNMP data collection request can be extracted. That is, in addition to providing the encapsulated SNMP request to the virtual machine, virtualization manager 117 can process the encapsulated SNMP request/command. In doing so, the data within the encapsulated request can be parsed/extracted (e.g., into respective fields), such as in a manner that enables the encapsulated request to be compatible with/comparable to an SNMP database (e.g., a management information base (MIB)).

At block 360, various elements (such as those extracted at block 350) can be stored in a database. In certain implementations, such a database can include a management information base (MIB). Moreover, in certain implementations the referenced database can store one or more elements originating at the virtual machine and/or one or more elements originating at a network device. For example, as depicted in FIG. 1, database 109 can be configured to store data originating from SNMP requests/commands (as well as related/associated data) that originate from host controller 105, network devices and/or virtual machines.

At block 370, one or more reports can be generated. In certain implementations, such reports can be generated based on/in view of the one or more elements originating at the virtual machine (such as those extracted at block 360) and/or one or more elements originating at the network device. That is, having extracted the various data elements from the SNMP requests/commands, and storing such data in database 109, various reports can be generated which can reflect both aspects of the performance of the associated virtual machines, as well as aspects of the performance of the network devices connected to the network.

At block 380, one or more commands can be generated. In certain implementations, such commands can be generated based on/in view of the one or more elements originating at the virtual machine and one or more elements originating at the network device. That is, having stored data from both virtual machines 112 and network devices 140 in a database 109 that utilizes a consistent SNMP format, various subsequent SNMP commands/requests can be generated and provided, such as requests that pertain to virtual machines and/or network devices. For example, one or more rules or conditions that pertain to both aspects of the functionality/operation of various virtual machines as well as aspects of the functionality/operation of various network devices can be used to generate SNMP requests, commands, etc., that can be directed to one or more virtual machines, network devices, etc. In doing so, a single, uniform interface can be provided (via SNMP monitor 107) for the monitoring, management, etc., of virtual machines and network devices using a unified set of protocols (e.g., SNMP).

Figure 4:
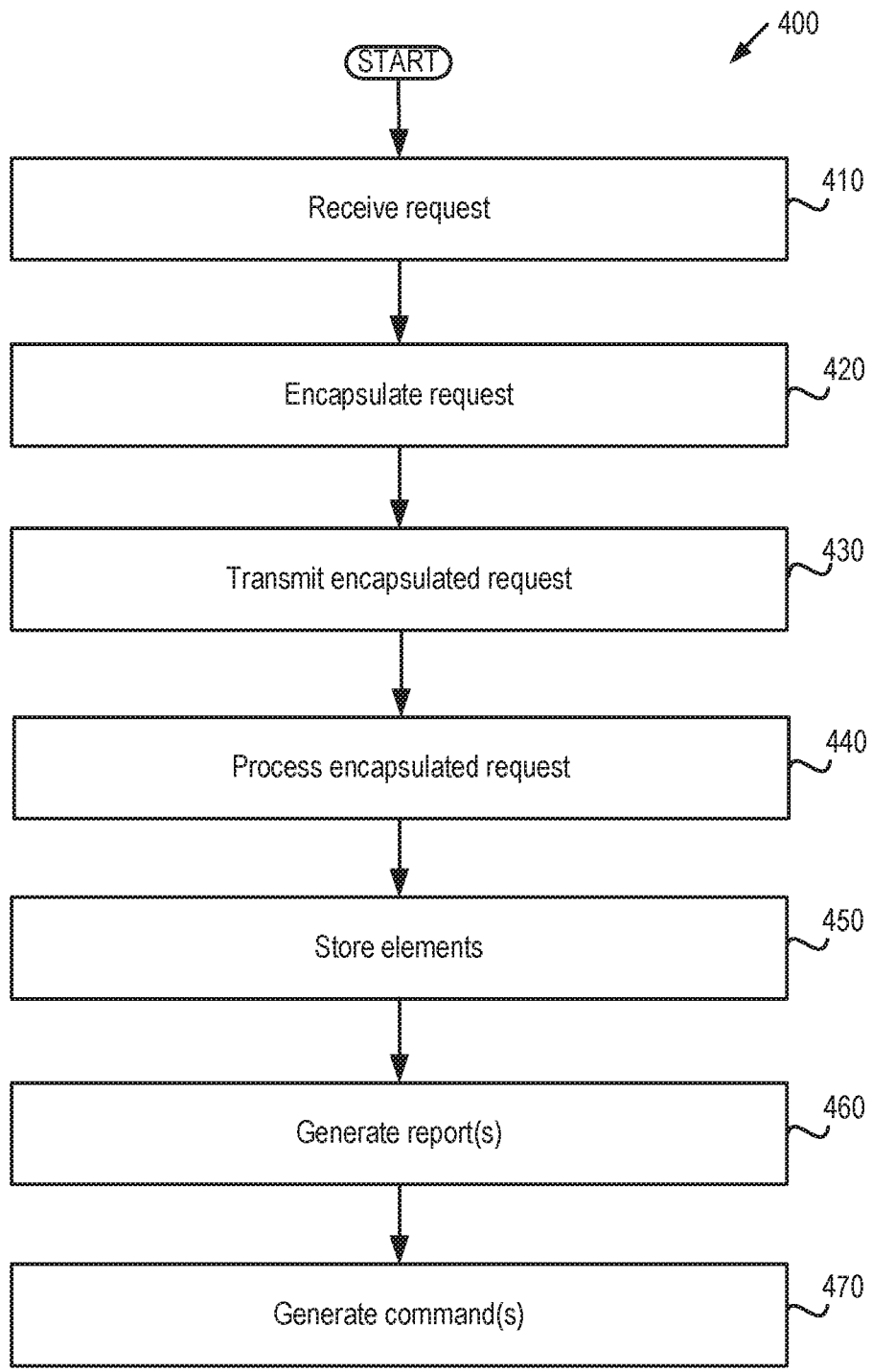
FIG. 4 depicts a flow diagram of an example method for transmitting encapsulated SNMP commands to virtual machines, in accordance with one or more aspects of the present disclosure.

FIG. 4 depicts a flow diagram of an illustrative example of a method 400 for transmitting encapsulated SNMP commands to virtual machines. Method 400 and/or each of its individual functions, routines, subroutines, or operations may be performed by one or more processors of the computer system (e.g., host controller 105, host 110, and/or host 120 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a request can be received. In certain implementations, such a request can be received at a virtualization manager. Moreover, in certain implementations such a request can be received from a first virtual machine 112 executing on a first host device 110. In certain implementations, such a request can be a Simple Network Management Protocol (SNMP) request. The referenced SNMP request can be directed to a virtual machine 112 on another host (e.g., host 120). For example, as shown in FIG. 1, one of the virtual machines executing on host 110 can send an SNMP request/command 160 via network 130 to host 120 which can be directed to a particular virtual machine 112 executing on host 120. For example, upon detection of an error (e.g., by a virtual machine and/or a network device), a request for status information can be generated (e.g., in order to identify the origin of the error, devices, virtual machines affected by the error, etc.). Such a request can be received by virtualization manager 117 at host 120.

At block 420, the request can be encapsulated. In certain implementations, such a request can be encapsulated within a SNMP request. That is, it can be appreciated that virtual machine 112 may not (by default) be configured to properly generate/transmit such SNMP requests, as such a virtual machine may, instead, communicate via VDSM and/or any other such protocol. Accordingly, upon receiving a request/command from a virtual machine 112, virtualization manager 117 can encapsulate the received request within an SNMP request/command.

At block 430, the encapsulated SNMP request can be transmitted. In certain implementations, such an encapsulated SNMP request can be transmitted to a second virtual machine 112 executing on a second host device 120. That is, having encapsulated (at block 420) the request/command originating at a virtual machine executing on host 110 within an SNMP request/command, such a SNMP request/command can be transmitted/provided to host 120 and to the virtual machine 112 to which it is directed.

At block 440, the encapsulated SNMP request can be processed. In doing so, one or more elements of the encapsulated SNMP request can be extracted. That is, in addition to providing the encapsulated SNMP request to the virtual machine, virtualization manager 117 can process the encapsulated SNMP request/command. In doing so, the data within the encapsulated request can be parsed/extracted (e.g., into respective fields), such as in a manner that enables the encapsulated request to be compatible with/comparable to an SNMP database (e.g., a management information base (MIB)).

At block 450, various elements can be stored, such as in a database 109. In certain implementations, such a database can include a management information base (MIB). Moreover, in certain implementations, the database stores elements originating at virtual machines and/or elements originating at network devices. For example, as depicted in FIG. 1, database 109 can be configured to store data originating from SNMP requests/commands (as well as related/associated data) that originate from host controller 105, network devices and/or virtual machines.

At block 460, one or more reports can be generated. In certain implementations, such reports can be generated based on/in view of the elements originating at virtual machines (such as those extracted at block 440) and/or the elements originating at network devices. That is, having extracted the various data elements from the SNMP requests/commands, and storing such data in database 109, various reports can be generated which can reflect both aspects of the performance of the associated virtual machines, as well as aspects of the performance of the network devices connected to the network.

At block 470, one or more commands can be generated. In certain implementations, such commands can be generated based on/in view of one or more of the elements originating at the virtual machine and one or more elements originating at the network device. That is, having stored data from both virtual machines 112 and network devices 140 in a database 109 that utilizes a consistent SNMP format, various subsequent SNMP commands/requests can be generated and provided, such as requests that pertain to virtual machines and/or network devices. For example, one or more rules or conditions that pertain to both aspects of the functionality/operation of various virtual machines as well as aspects of the functionality/operation of various network devices can be used to generate SNMP requests, commands, etc., that can be directed to one or more virtual machines, network devices, etc. In doing so, a single, uniform interface can be provided (via SNMP monitor 107) for the monitoring, management, etc., of virtual machines and network devices using a unified set of protocols (e.g., SNMP).

An illustrative example of a method 500 for transmitting encapsulated SNMP commands to virtual machines. Method 500 and/or each of its individual functions, routines, subroutines, or operations may be performed by one or more processors of the computer system (e.g., host controller 105, host 110, and/or host 120 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a data collection request can be generated. In certain implementations, such a request can be an Simple Network Management Protocol (SNMP) request generated by SNMP monitor 107 on host controller 105, and can be directed to a virtualization manager 117 executing on a host device (e.g., host 120) and/or to a network device 140 that is connected (via network 130) to host 120 and/or host controller 105. For example, as shown in FIG. 1 and described herein, SNMP monitor 107 on host controller 105 can generate a SNMP request/command 160 that is directed to host 120 (e.g., a particular virtual machine 112 executing on host 120) and/or to a network device 140 connected to the host controller 105 and/or the host 120.

At block 520, the SNMP data collection request (such as that generated at block 510) can be encapsulated. That is, it can be appreciated that while network device 140 can be configured to receive the requests/commands via SNMP, virtual machine 112 may not (by default) be configured to properly receive/process such SNMP requests. Accordingly, upon generating a data collection request (and/or any other such SNMP request/command), SNMP monitor 107 of host controller 105 can further encapsulate the generated SNMP request (e.g., within a request/command format with respect to which the virtual machine is configured).

At block 530, the encapsulated SNMP data collection request can be provided. In certain implementations, such an encapsulated request can be provided to a virtual machine 112 executing on a host device (e.g., host 110, 120) via network 130. That is, having encapsulated (at block 520) the generated SNMP request/command, the encapsulated SNMP request/command can be provided to the virtual machine 112 to which it is directed.

At block 540, one or more responses to the encapsulated SNMP data collection request can be received. Such responses can include various status updates from the virtual machine/host that are provided in response to the request, and/or elements extracted from the encapsulated SNMP data collection request. That is, as noted the encapsulated SNMP request can be processed in order to parse/extract data contained therein (e.g., into respective fields), such as in a manner that enables the encapsulated request to be compatible with/comparable to an SNMP database (e.g., a management information base (MIB)).

At block 550, various elements (such as those received at block 540) can be stored in a database. In certain implementations, such a database can include a management information base (MIB). Moreover, in certain implementations the referenced database can store one or more elements received from the virtual machine and/or a network device. For example, as depicted in FIG. 1, database 109 can be configured to store data received from host 110, 120, network devices and/or virtual machines.

At block 560, one or more reports can be generated. In certain implementations, such reports can be generated based on/in view of the one or more elements originating at the virtual machine (such as those received at block 540 and stored at block 550) and/or one or more elements received from a network device. That is, having received and stored the various data elements, various reports can be generated (e.g., by SNMP monitor 107) which can reflect both aspects of the performance of the associated virtual machines, as well as aspects of the performance of the network devices connected to the network.

At block 570, one or more commands can be generated. In certain implementations, such commands can be generated based on/in view of the one or more elements received (e.g., at block 540) from a virtual machine and/or a network device. That is, having stored data from both virtual machines 112 and network devices 140 in a database 109 that utilizes a consistent SNMP format, various subsequent SNMP commands/requests can be generated and provided, such as requests that pertain to virtual machines and/or network devices. For example, one or more rules or conditions that pertain to both aspects of the functionality/operation of various virtual machines as well as aspects of the functionality/operation of various network devices can be used to generate SNMP requests, commands, etc., that can be directed to one or more virtual machines, network devices, etc. In doing so, a single, uniform interface can be provided (via SNMP monitor 107) for the monitoring, management, etc., of virtual machines and network devices using a unified set of protocols (e.g., SNMP).

Figure 5:
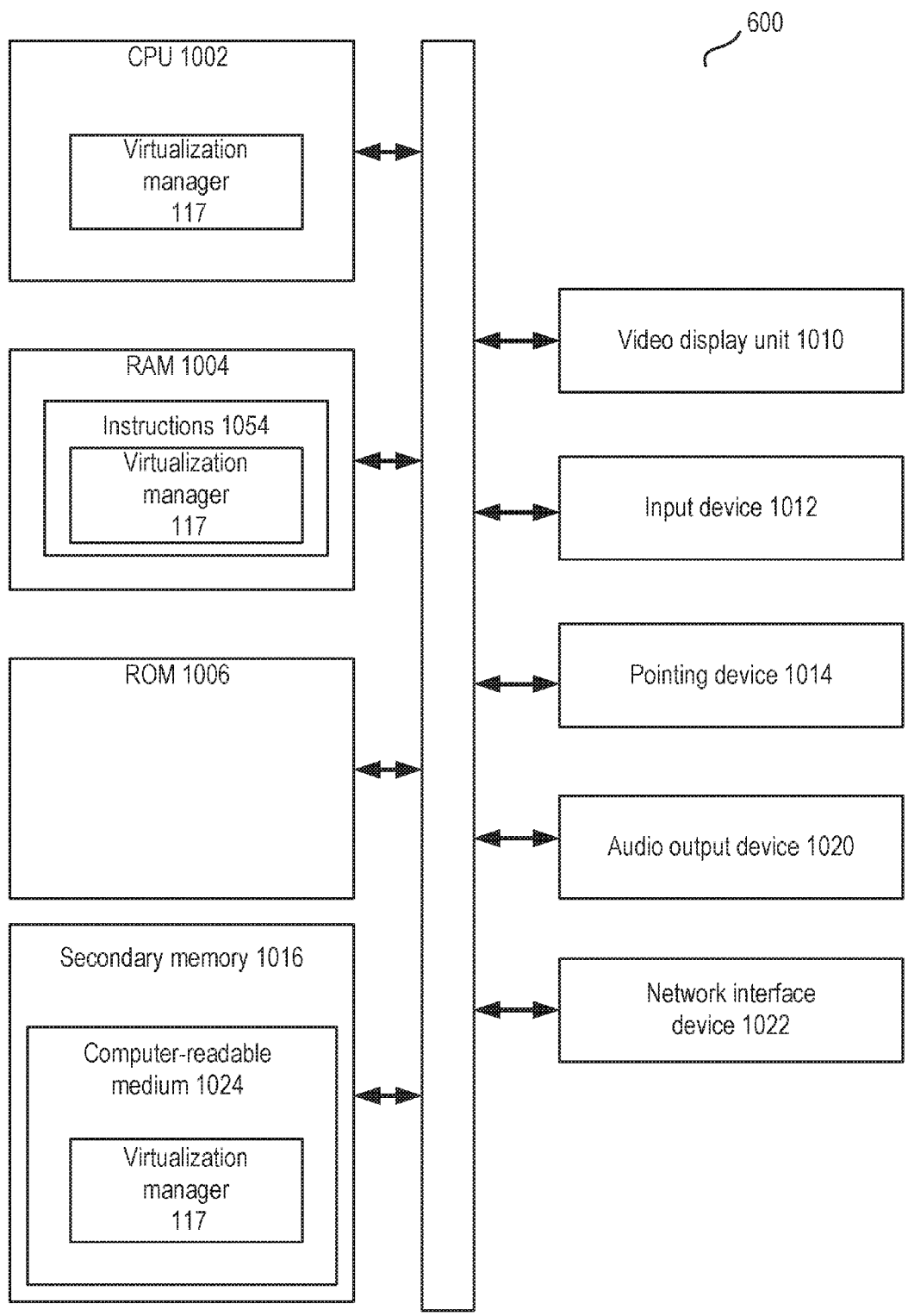
FIG. 5 depicts a block diagram of an illustrative computer system operating in accordance with the examples of the present disclosure.

FIG. 5 depicts an example computer system 600 within which a set of instructions, for causing the computer system to perform any one or more of the methods described herein, may be executed. In certain implementations, computer system 600 may correspond to the host controller 105, host 110, and/or host 120 of FIG. 1.

In an illustrative example, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peerto-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 1022. Computer system 600 also may include a video display unit 1010 (e.g., an LCD), an alpha-numeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions of migration agent 107, 117 implementing the methods for monitoring virtual machine protocols, services, and operations described herein. Instructions of virtualization manager 117 may also reside, completely or partially, within main memory 1004 and/or within processor 1002 during execution thereof by computer system 600, hence, main memory 1004 and processor 1002 may also constitute machine-readable storage media.

While computer-readable storage medium 1024 is shown in the illustrative example as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "initiating", "receiving", "encapsulating", "providing", "processing", "storing", "transmitting", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method comprising:
   receiving a Simple Network Management Protocol (SNMP) request;
   encapsulating, by a virtualization manager executing on a processing device, the SNMP request in a format with respect to which a virtual machine is configured to communicate; and
   providing the encapsulated SNMP request to the virtual machine.

2. The method of claim 1, wherein the SNMP request comprises a request for status information.

3. The method of claim 2, wherein the request for status information is generated in response to a detection of an error.

4. The method of claim 1, wherein the SNMP request comprises a data collection request directed to the virtual machine.

5. The method of claim 1, further comprising:
   receiving, from the virtual machine and in response to the encapsulated SNMP request, a response; and
   storing the response in a database.

6. The method of claim 5, wherein the database stores an element originating at the virtual machine and an element originating at a network device.

7. The method of claim 6, further comprising generating a report in view of the element originating at the virtual machine and the element originating at the network device.

8. The method of claim 7, wherein the report reflects a performance of the virtual machine.

9. The method of claim 7, wherein the report reflects a performance of the network device.

10. The method of claim 6, further comprising generating a command in view of the element originating at the virtual machine and the element originating at the network device.

11. A system comprising:
a memory; and
a processing device, operatively coupled to the memory, to:
receive a Simple Network Management Protocol (SNMP) request;
encapsulate, by a virtualization manager, the SNMP request in a format that is compatible with a protocol with respect to which a virtual machine is configured to communicate; and
provide the encapsulated SNMP request to the virtual machine.

12. The system of claim 11, wherein the SNMP request comprises a request for status information generated in response to a detection of an error.

13. The system of claim 11, wherein the processing device is further to:
process the encapsulated SNMP request to extract an element of the encapsulated SNMP request; and
store the element in a database.

14. The system of claim 11, wherein the processing device is further to generate a report in view of an element originating at the virtual machine and an element originating at a network device.

15. The system of claim 14, wherein the report reflects a performance of the virtual machine.

16. The system of claim 14, wherein the processing device is further to generate a command in view of the element originating at the virtual machine and the element originating at the network device.

17. A non-transitory computer-readable storage medium comprising executable instructions that, when executed by a processing device, cause the processing device to:
receive a Simple Network Management Protocol (SNMP) request;
encapsulate, by a virtualization manager executing on the processing device, the SNMP request in a format that is compatible with a protocol with respect to which a virtual machine is configured to communicate; and
transmit the encapsulated SNMP request to the virtual machine.

18. The non-transitory computer-readable storage medium of claim 17, further comprising instructions that, when executed by the processing device, cause the processing device to:
process the encapsulated SNMP request to extract an element of the encapsulated SNMP request; and
store the element in a database.

19. The non-transitory computer-readable storage medium of claim 17 further comprising instructions that, when executed by the processing device, cause the processing device to generate a report in view of an element originating at the virtual machine and an element originating at a network device.

20. The non-transitory computer-readable storage medium of claim 17, wherein the SNMP request comprises a request for status information generated in response to a detection of an error.

* * * * *